(12) United States Patent
Naranjo

(10) Patent No.: US 10,807,558 B2
(45) Date of Patent: Oct. 20, 2020

(54) SIDE IMPACT AIRBAG MODULE

(71) Applicant: Joyson Safety Systems Acquisition LLC, Auburn Hills, MI (US)

(72) Inventor: Eric Naranjo, Lake Orion, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 34 days.

(21) Appl. No.: 16/179,230

(22) Filed: Nov. 2, 2018

(65) Prior Publication Data

US 2020/0139924 A1 May 7, 2020

(51) Int. Cl.
*B60R 21/213* (2011.01)
*B60R 21/2334* (2011.01)
*B60R 21/232* (2011.01)
*B60R 21/26* (2011.01)
*B60R 21/237* (2006.01)

(52) U.S. Cl.
CPC ........ *B60R 21/2334* (2013.01); *B60R 21/213* (2013.01); *B60R 21/232* (2013.01); *B60R 21/237* (2013.01); *B60R 21/26* (2013.01)

(58) Field of Classification Search
CPC ........................... B60R 21/232; B60R 21/2334
See application file for complete search history.

(56) References Cited

U.S. PATENT DOCUMENTS

| | | | |
|---|---|---|---|
| 7,097,200 B2 * | 8/2006 | Wold | ............... B60R 21/213 280/730.2 |
| 7,401,805 B2 | 7/2008 | Coon et al. | |
| 7,699,343 B2 | 4/2010 | Kwak et al. | |
| 8,500,162 B2 | 8/2013 | Moffitt et al. | |
| 9,266,491 B1 * | 2/2016 | Gillay | ............... B60R 21/213 |
| 9,266,492 B2 | 2/2016 | Byun | |
| 9,555,761 B2 | 1/2017 | Gilles et al. | |
| 2002/0195803 A1 * | 12/2002 | Terbu | ............... B60R 21/20 280/730.2 |
| 2011/0127755 A1 * | 6/2011 | Beppu | ............... B60R 21/232 280/730.2 |

(Continued)

FOREIGN PATENT DOCUMENTS

WO   WO-2016195213 A1 * 12/2016 ............. B23B 27/08

OTHER PUBLICATIONS

Son et al., Automobile-Use Interior Material and Method for Manufacturing Same, Dec. 8, 2016, EPO, WO 2016/195213 A1, Machine Translation of Description (Year: 2016).*

(Continued)

*Primary Examiner* — James A English
(74) *Attorney, Agent, or Firm* — Gordon Rees Scully Mansukhani, LLP

(57) ABSTRACT

A side curtain air bag module includes an inflatable cushion, an inflator, and a flexible ramp. The inflatable cushion includes a first panel coupled to a second panel. The ramp is configured to prevent interference from the pillar trim with deployment of the cushion. The ramp includes at least a first slot, a second slot, and the inflatable cushion includes first and second flexible tabs that couple the ramp to the inflatable cushion. The first slot may have a horizontal orientation, while the second slot may have a vertical orientation to allow alignment with the C-pillar during installation.

18 Claims, 3 Drawing Sheets

(56) References Cited

U.S. PATENT DOCUMENTS

| | | | |
|---|---|---|---|
| 2012/0286499 A1* | 11/2012 | Wiik | B60R 21/213 |
| | | | 280/730.2 |
| 2016/0280177 A1* | 9/2016 | Young | B60R 21/232 |
| 2018/0290618 A1 | 10/2018 | Floersheimer | |
| 2019/0047505 A1* | 2/2019 | Hioda | B60R 21/232 |

OTHER PUBLICATIONS

Son et al., Automobile-Use Interior Material and Method for Manufacturing Same, Dec. 8, 2016, EPO, WO 2016/195213 Al, English Abstract (Year: 2016).*

* cited by examiner

SIDE IMPACT AIRBAG MODULE

BACKGROUND

The present disclosure relates generally to the field of airbag modules for use in motor vehicles. More specifically, this disclosure relates to an airbag module for protecting vehicle occupants in the event of a side impact involving the vehicle. The module includes a side-curtain inflatable airbag and a ramp structure that prevents the side-curtain airbag from deploying into a pillar trim of the vehicle.

Side curtain airbag assemblies are typically installed along the roof rail of a passenger compartment of a vehicle. The side curtain airbag assembly usually extends from the A-pillar across the B-pillar to the C-pillar of the vehicle. The side-curtain airbag assembly is secured to the roof rail by a plurality of fasteners, which typically secure the inflator as well as the air bag. During deployment, the B-pillar or C-pillar trim can sometimes interfere with the side-curtain airbag assembly, resulting in a poor or delayed deployment of the air bag. A ramp or deflector may be installed adjacent to the B-pillar or C-pillar to prevent interference with the deployment of the air bag.

Conventional ramps or deflectors are typically extruded using different types of plastics with varying profiles. These extruded plastic ramps or deflectors are able to achieve a bridge blocking the gap that extends from the head side airbags to the pillar trims. However, the design and development for these conventional ramps require a long lead time, as well as capital investment. It would be advantageous to provide a ramp or deflector that is cost-effective, sturdy, versatile with respect to the ability to add or remove different features, and that may be quickly and simply manufactured and installed in the airbag module.

SUMMARY

One embodiment of the present application relates to an inflatable curtain airbag assembly for use in a vehicle. The inflatable curtain airbag assembly comprises an inflatable cushion configured to be stored proximate to a roof rail of the vehicle when folded and inflate into a curtain configuration along an interior side of a passenger compartment of the vehicle; an inflator that supplies gas into the cushion to inflate the cushion; and a ramp configured to prevent interference with deployment of the cushion. The ramp includes at least a first slot and a second slot. The cushion includes a first flexible tab and a second flexible tab, the first flexible tab and the second flexible tab extending through the first slot and the second slot, respectively, to thereby couple the ramp to the inflatable cushion. An end of the first flexible tab and an end of the second flexible tab are configured to be connected to an interior of a vehicle body.

Another embodiment relates to an inflatable curtain airbag assembly for use in a vehicle. The inflatable curtain airbag assembly comprises an inflatable cushion that is configured to be stored proximate to a roof rail of a vehicle when folded and inflate into a curtain configuration along an interior side of a passenger compartment of the vehicle; an inflator that supplies gas into the cushion to inflate the cushion; and a ramp configured to prevent interference with deployment of the cushion by directing deployment of the cushion, such that the ramp prevents the cushion from inadvertently deploying into a pillar trim of the vehicle. The ramp includes at least a first slot and a second slot. The cushion includes a first flexible tab and a second flexible tab, the first flexible tab and the second flexible tab extending through the first slot and the second slot, respectively, to thereby couple the ramp to the inflatable cushion. An end of the first flexible tab and an end of the second flexible tab are configured to be connected to an interior of a vehicle body.

DETAILED DESCRIPTION

Figure 1:
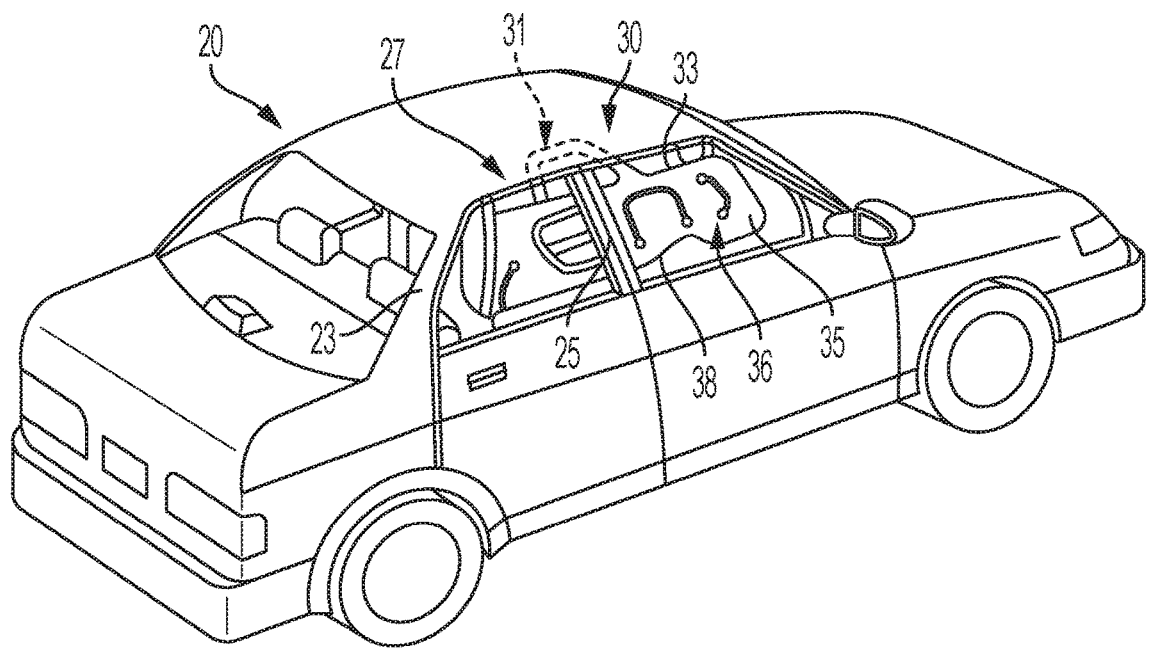
FIG. 1 is a perspective view of a motor vehicle with an exemplary embodiment of a side-curtain airbag module shown deployed from the roof-rail of the vehicle.

Side-curtain airbags (SCABs) are located in vehicles, such as motor vehicles, for restraining an occupant to prevent the occupant from directly impacting other vehicle components, such as a door assembly or a pillar assembly, and for reducing the impact forces on the occupant. SCABs are typically configured to provide restraint to outboard positioned vehicle occupants, such as those adjacent to door assemblies. However, SCABs may be used to provide restraint to any vehicle occupant located in any seating row (e.g., first, second, third) in the vehicle.

A SCAB module is generally stored within and deployed from the roof-rail (i.e., the portion of the vehicle provided between the top of the door frame and the roof member or assembly) of the vehicle. Side-curtain airbags are typically manipulated into a stored configuration through a process of folding, rolling, or a combination of rolling and folding to compact the airbag in order for the airbag to fit into the small volume (and small cross-section) of the vehicle roof rail and to aid vehicle installation of the airbag module. After vehicle installation, the airbag module may be covered, such as by a roof-liner or head-liner, to provide improved interior vehicle aesthetics.

Vehicles are configured with pillars that join the roof assembly to the vehicle, and typical vehicles (e.g., sedan) include three such pillars on each side of the vehicle, which are symmetrically configured about a fore-aft central axis through the vehicle from the three pillars on the opposite side of the vehicle. The first pillars (or A-pillars) are generally provided forward in the vehicle between the windshield and the front door assembly, whereby the A-pillar extends from a front panel (e.g., front-quarter panel) and/or hood to the roof assembly. The second pillars (or B-pillars) are generally provided centrally in the vehicle between the front and rear door assemblies, such as for a four-door sedan, whereby the B-pillar may extend from the floor assembly to the roof assembly. The third pillars (or C-pillars) are generally provided rearward in the vehicle between the rear window and the rear door assembly, whereby the C-pillar may extend from a rear panel (e.g., rear-quarter panel) and/or trunk to the roof assembly.

The pillars are typically configured to be high strength for safety of the occupants. The pillars are configured to be strong enough to resist buckling and/or bending, such as during a vehicle rollover event, and accordingly are typically made of steel or other high-strength materials with cross-sections, such as C-shaped cross-sections, having relative high moments of inertia that provide high bending and/or buckling resistance. The strength requirement of the pillar, especially the B-pillar, causes the pillar to often have a relatively large cross-section. The desire to keep exterior surfaces of the vehicle flush for aesthetic purposes leads the design of the pillar to have an increased section protruding in the interior direction (i.e., toward the center of the vehicle). This protruding section induces the vehicle manufacturers to include trim and/or other members to cover the pillar on the interior side of the vehicle to improve the interior vehicle aesthetics.

The trim or other members used to cover the pillar (e.g., the B-pillar or C-pillar) to improve aesthetics generally are made of a polymer or other similar material, and will be configured to include a C-shaped (or other suitable) cross-section that forms an inner channel that the pillar occupies after installation of the trim cover. The shape of the trim cover coupled with the shape of the B-pillar or C-pillar can form a lip that protrudes inwardly toward the interior of the vehicle from just below the roof-rail, which is configured to house or store the SCAB module. This inwardly protruding lip can be problematic. For example, this lip may serve as a catch to a SCAB deploying from the roof-rail, causing the cushion deployment to be delayed or the deployment trajectory of the cushion to be influenced, which has the potential to reduce the effectiveness of occupant restraint.

A SCAB is often rolled (for storage) in an outboard or inboard direction to have a substantially downward deployment trajectory that substantially follows the contour of the door and window assembly as the cushion extends and unfolds downwardly. This configuration avoids having the cushion deploy in a lateral or quasi-lateral direction, such as in an oblique direction, substantially toward the occupant inducing relative higher impact (or "punch") forces upon contact with the occupant due to higher lateral forces from the lateral acceleration of the deploying airbag or inflatable cushion induced by higher internal airbag pressure caused by inflation gas. However, the lip formed by the trim cover and B-pillar may delay and/or influence the deployment trajectory of the cushion by acting as a catch.

The ramp or deflector described herein is configured to provide a method for avoidance of the inflating cushion from catching on the trim (e.g, the lip of the trim) covering a vehicle pillar (e.g., B-pillar or C-pillar), the trim cover, or other structure of the vehicle, such that a side-impact airbag deploys in an undelayed and unimpeded manner, as well as deploying without any improper influence to the deployment trajectory in order to deploy to a final position that optimizes occupant restraint. The airbag modules described herein may be configured to continue deploying (once beyond the lip or potentially obstructing member) in an approximately downward direction along the interior of the vehicle in order to reduce the lateral and quasi-lateral forces to reduce the impact forces on the restrained occupant.

With reference to FIG. 1, the motor vehicle 20 is illustrated with the SCAB module 30 deployed (or inflated) from the roof-rail 27 to a position provided between the occupants (not shown) and the interior surfaces of the door assemblies. The SCAB module 30 is triggered by a dynamic vehicle event, such as a rollover or side impact, whereby vehicle sensors recognize the vehicle event and communicate to a control device or module, which in turn initiates deployment of the airbag. According to an exemplary embodiment, the deployed SCAB module 30 provides restraint and/or cushioning to the front and rear occupants located on the passenger-side of vehicle 20. The SCAB module 30, for example, restrains or cushions the occupants to prevent contact with the interior of the door assemblies located on the passenger-side of the vehicle 20, with the B-pillar 25 provided between the front and rear door assemblies, the C-pillar 23 provided aft of the rear door assembly and the rear frame of the vehicle, and/or with other vehicle 20 components with a relative high force created by a relative high acceleration of the occupants induced by the sudden deceleration of the vehicle 20.

The SCAB module 30 may include an inflator 31 and an airbag or inflatable cushion 35. The cushion 35 includes one or more inflatable chambers 36 and is connected to the roof side rail 27 by one or more tabs 33. As described herein, the airbag module may include a ramp or deflector to ensure the airbag and trailing edge 38 deploys properly into position along the side of the passenger compartment of the vehicle.

Figure 2:
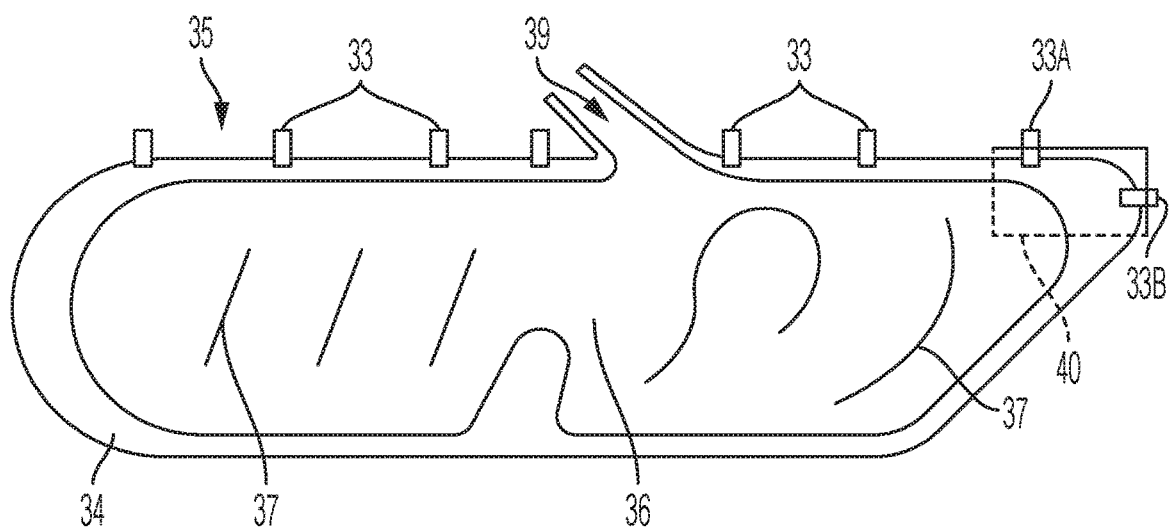
FIG. 2 is a side-view of an exemplary embodiment of an airbag for use in an airbag module with the airbag shown in an unfolded configuration.

With reference to FIG. 2, an exemplary embodiment of an inflatable cushion 35 for use in a SCAB module 30 is illustrated in the flat configuration, prior to folding and/or rolling into the stored configuration. The cushion 35 may be formed from one or more airbag panels 34 coupled through conventional methods (e.g., stitching, adhesive) at seams 37 to form at least one inflatable chamber 36 configured to receive inflation gas from the inflator during deployment. The cushion 35 is coupled to the roof-rail 27 of the vehicle 20 via flexible tabs 33. The flexible tabs 33 are integrally formed with the cushion 35 that couple the SCAB module 30 and the ramp or deflector 40 to the vehicle 20. FIGS. 1 and 2 show an airbag module with an inflator mounted above the B-pillar (i.e., a mid mount configuration). The mid mounted inflator 31 deploys inflation gas through a conduit 39 into the cushion 35. However, the present application also includes other side impact airbag modules with inflators mounted at other locations such as above the rear pillar, for example.

Figure 3:
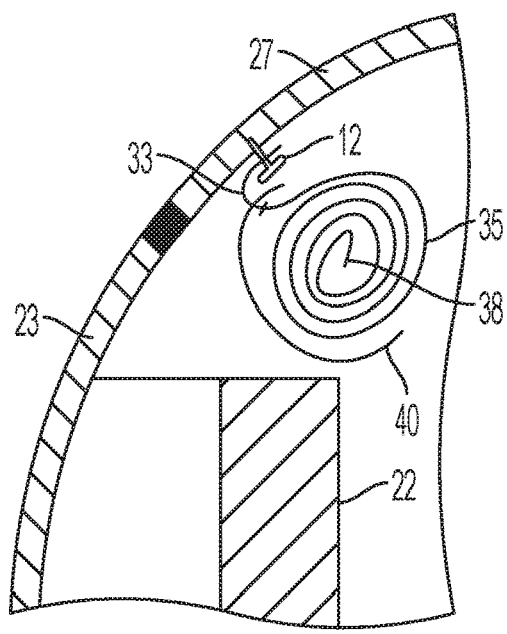
FIG. 3 is an end cross-sectional view of the airbag, ramp and vehicle frame showing the installation state of a side-curtain airbag assembly.
Figure 4:
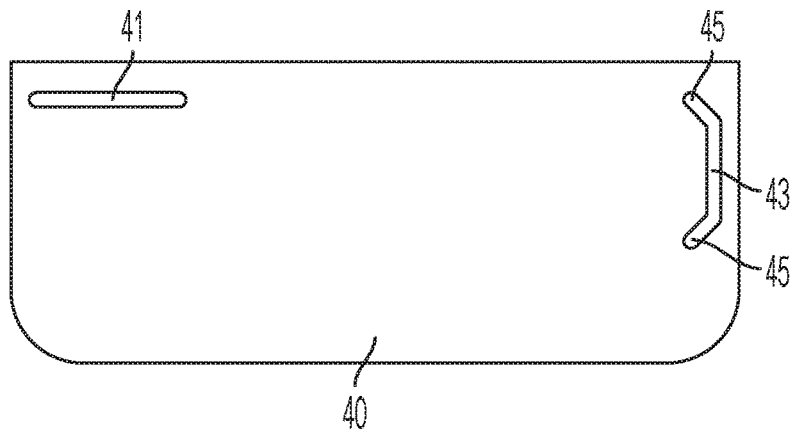
FIG. 4 is a top plan view of an embodiment of an airbag ramp or deflector prior to installation.

According to exemplary embodiments of the airbag module, the flexible tabs 33 are preferably flexible members (e.g., fabric straps, steel or composite brackets, etc.) that couple the cushion 35 and the ramp 40 (indirectly) to the vehicle 20, such as to the roof-rail 27 of the vehicle 20, through any suitable method. For example, as shown in FIG. 3, a fastener 12 may be used to couple the tab 33 to the vehicle. In yet another embodiment, the flexible tabs 33A and 33B are also formed to couple the cushion 35 and the ramp 40 to the C-pillar 23 of the vehicle 20, as well as the roof-rail 27, through any suitable method, as shown in FIGS. 3 and 4. The flexible tabs 33 may be integrated or separated from the cushion 35 and may be formed using any suitably known or future developed methods. FIG. 2 also shows an exemplary ramp 40 adjacent to the rearmost portion of the inflatable cushion 35. The structure and operation of the ramp 40 shown in FIG. 2 (as well as other embodiments) is described in further detail below.

FIG. 3 shows the inflatable cushion 35 in a stored outboard rolled configuration prior to deployment. The ramp 40 is positioned in a stored configuration to ensure the cushion 35 deploys properly and avoids any unintended interaction with the C-pillar trim 22. The trim 22 may be positioned so that there is a gap outboard the trim. The ramp 40 also ensures that the cushion 35 deploys inboard of and not into the gap. An exemplary tab 33 is shown in FIG. 3. However, as explained herein any one of a number of tabs 33, 33A and 33B may pass through one or slots in the ramp to ensure that the ramp is properly positioned adjacent the cushion 35. The tabs may connect to the roof side rail 27 or one of the vehicle pillars (e.g., the C-pillar 23). Optionally, the ramp 40 may be further releasably secured to the cushion 35 using tape, for example.

Figure 5:
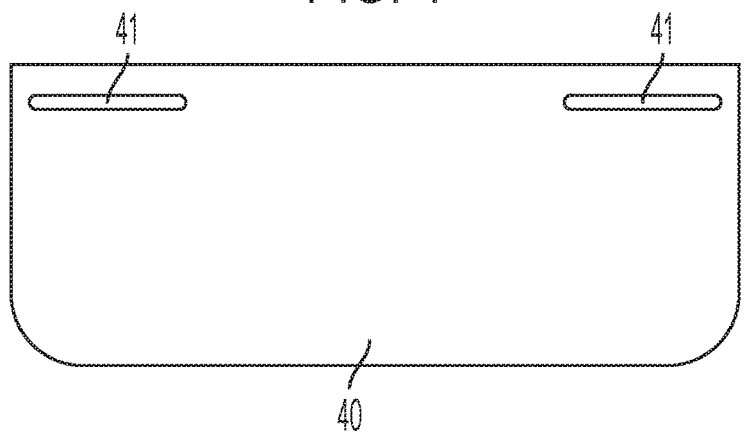
FIG. 5 is a top plan view of an alternative embodiment of an airbag ramp or deflector prior to installation.
Figure 6:
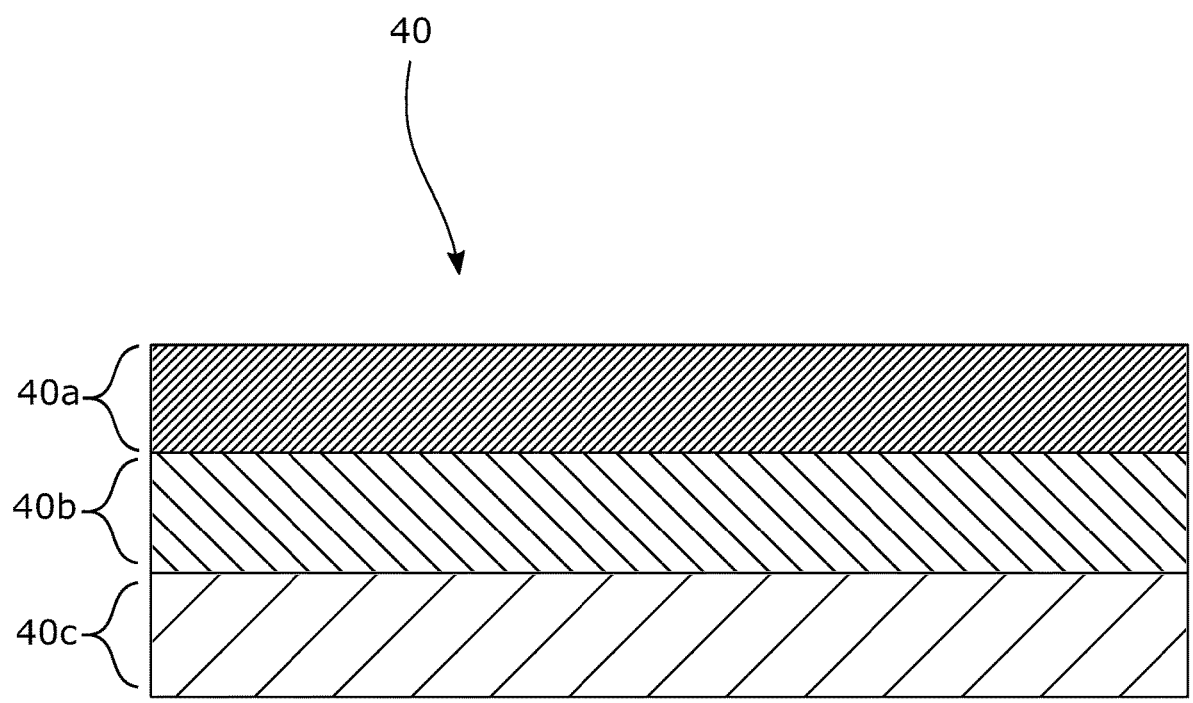
FIG. 6 is a cross-sectional view of the airbag ramp or deflector of FIG. 4 of FIG. 5.

With reference to FIGS. 4-6, exemplary embodiments of the ramp 40 are illustrated in the flat configuration, prior to folding and/or rolling into the stored configuration. Preferably, the ramp 40 is a flexible ramp constructed from a multi-layer, laminate material. Preferably, the ramp consists of at least three layers: a base layer 40a and two outer layers 40b, 40c. Preferably, the base layer is a non-woven fabric. In some embodiments, however, the base layer may be a woven fabric. The outer layers may be constructed from a woven fabric or from a synthetic material, such as polypropylene or polyethylene. However, any material may be employed for the outer layers of the ramp as long as the material is flexible, while still maintaining enough rigidity to perform the functions of the ramp.

In the exemplary embodiment illustrated in FIG. 4, the ramp 40 includes at least two slots 41 and 43. The slots 41 and 43 are formed to receive the flexible tabs 33A and 33B, respectively. When the flexible tabs 33A and 33B are received by and extend through the two slots 41 and 43 in the ramp 40, the ramp 40 will be located in the proper position relative to the vehicle 20 and the C-pillar 23 (and C-pillar trim 22). The vertical orientation of the rear slot 43 facilitates coupling of the slot 43 with the horizontal tab 33B connected to the C-pillar 23. However, the invention is not limited to the horizontal/vertical orientations of the slots 41 and 43 illustrated in FIG. 4.

Preferably, the rear vertical slot 43 includes at least two tearing portions 45. The tearing portions 45 are located at each end of the slot 43, and may be oriented diagonally with respect to the slot 43. The tearing portions 45 may be configured so that they are positioned in a direction facing towards an interior of the ramp 40, or alternatively configured so that they are positioned in a direction facing towards an exterior of the ramp 40. The tearing portions 45 allow for a controlled deployment of the cushion 35. For example, the slot 43 interacts with a horizontal flexible tab 33B located on the C-pillar 23 in order to properly align the ramp 40 with the cushion 35 during storage and when the airbag is initially inflated. However, during the deployment of the airbag, the tearing portions 45 allow the position of the horizontal tab 33B relative to the ramp 40 to change. For example, if the inflation of the cushion 35 necessitates detachment of the tab 33B from the vehicle 20, the slot 43 may also tear from the horizontal flexible tab 33B via the tearing portions 45. The coupling of the slot 43 with horizontal tab 33B ensures proper positioning of the ramp 40 relative to the cushion 35 at the beginning of the deployment of the cushion 35. After the initial inflation of the cushion 35, the slot 43 may tear and the tab 33B may even completely tear through the ramp.

In an alternative exemplary embodiment shown in FIG. 5, the ramp 40 may include a pair of horizontal slots 41. Both of the slots 41 are oriented such that the slots 41 are substantially parallel with the roof-rail 27 of the vehicle. The horizontal orientation of the slots facilitates coupling of the ramp 40 with the tabs 33 passing through the slots 41 in the vicinity of the trim associated with the B pillar 25 of the vehicle 20. In this alternate embodiment, the tabs 33 (after passing though slots 41) could be coupled to the roof rail in the vicinity of the A-pillar or B-pillar along the roof-rail 27 of the vehicle. In the exemplary embodiments describe herein, the vehicle is described as having A, B and C pillars. However, certain longer vehicles may include A, B, C and D pillars such that the ramp configurations disclosed herein may be suitable for use along one of the mid or rear pillars of the vehicle frame without regard to the naming convention of the pillar.

The present invention provides the advantage of enabling installation of a ramp that provides coverage for the C-pillar (i.e., that helps prevent the airbag from being trapped by the C-pillar trim during deployment), while simultaneously allowing for the airbag to detach from the C-pillar and/or separate from the ramp when necessary during deployment of the airbag to prevent crimping or wrinkling in the back portion of the airbag that is near the slot 43 of the ramp 40. Furthermore, the flexible ramp or deflector described above is cost-effective, sturdy, versatile with respect to the ability to add or remove different features, and may be quickly and simply manufactured.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An inflatable curtain airbag assembly for a vehicle comprising:
    an inflatable cushion configured to be stored proximate to a roof rail of the vehicle when folded and inflate into a curtain configuration along an interior side of a passenger compartment of the vehicle;
    an inflator that supplies gas into the cushion to inflate the cushion; and
    a ramp positioned only at one end of the cushion and extending longitudinally only a distance to cover a trim located over a vehicle pillar located proximate to the one end of the cushion and being configured to prevent the cushion from interfering with the trim during deployment of the cushion, wherein
        the ramp has at least a first slot and a second slot, the ramp including a base layer of non-woven fabric;
        the cushion includes a first flexible tab and a second flexible tab;
        the first flexible tab and the second flexible tab extend through the first slot and the second slot, respectively, to thereby couple the ramp to the inflatable cushion; and
        an end of the first flexible tab and an end of the second flexible tab are configured to be connected to an interior of a vehicle body.

2. The inflatable curtain airbag assembly of claim 1, wherein the first slot is oriented in a horizontal direction substantially parallel to the roof rail of the vehicle.

3. The inflatable curtain airbag assembly of claim 2, wherein the second slot is oriented in a vertical direction substantially perpendicular to the roof rail of the vehicle, and wherein the second flexible tab extends longitudinally rearward from the end of the cushion to attach to the interior of the vehicle body.

4. The inflatable curtain airbag assembly of claim 2, wherein the second slot is oriented in a horizontal direction substantially parallel to the roof rail of the vehicle.

5. The inflatable curtain airbag assembly of claim 3, wherein the second flexible tab is configured to be connected to a portion of the interior of the vehicle body located in a rear of the passenger compartment of the vehicle.

6. The inflatable curtain airbag assembly of claim 1, wherein the ramp includes a secondary layer of polyethylene.

7. The inflatable curtain airbag assembly of claim 1, wherein the ramp includes a secondary layer of polypropylene.

8. The inflatable curtain airbag assembly of claim 1, wherein the second flexible tab is configured to be connected to a C-pillar of the interior of the vehicle body.

9. The inflatable curtain airbag assembly of claim 1, wherein the first and second flexible tabs are configured to be connected adjacent a B-pillar of the interior of the vehicle body.

10. The inflatable curtain airbag assembly of claim 4, wherein the first and second flexible tabs are configured to be connected adjacent a B-pillar of the interior of the vehicle body.

11. An inflatable curtain airbag assembly for a vehicle comprising:
    an inflatable cushion configured to be stored proximate to a roof rail of the vehicle when folded and inflate into a curtain configuration along an interior side of a passenger compartment of the vehicle;
    an inflator that supplies gas into the cushion to inflate the cushion; and
    a ramp configured to prevent interference with deployment of the cushion, wherein
        the ramp has at least a first slot and a second slot, the ramp including a base layer of non-woven fabric;
        the cushion includes a first flexible tab and a second flexible tab;
        the first flexible tab and the second flexible tab extend through the first slot and the second slot, respectively, to thereby couple the ramp to the inflatable cushion; and
        an end of the first flexible tab and an end of the second flexible tab are configured to be connected to an interior of a vehicle body;
    wherein the first slot is oriented in a horizontal direction substantially parallel to the roof rail of the vehicle;
    wherein the second slot is oriented in a vertical direction substantially perpendicular to the roof rail of the vehicle; and
    wherein
        the second slot includes a primary vertical portion and at least two tearing portions; and
        the ramp is configured to tear starting from a point of the second slot located at a base of each of the tearing portions when sufficient force is applied to the ramp by the deployment of the cushion.

12. The inflatable curtain airbag assembly of claim 11, wherein the at least two tearing portions are located at opposite ends of the second slot.

13. The inflatable curtain airbag assembly of claim 12, wherein the at least two tearing portions are oriented at an obtuse angle with respect to the primary vertical portion.

14. An inflatable curtain airbag assembly comprising:
    an inflatable cushion that is configured to be stored proximate to a roof rail of a vehicle when folded and inflate into a curtain configuration along an interior side of a passenger compartment of the vehicle;
    an inflator that supplies gas into the cushion to inflate the cushion; and
    a ramp configured to prevent interference with deployment of the cushion by directing deployment of the cushion, such that the ramp prevents the cushion from inadvertently deploying into a pillar trim of the vehicle, wherein
        the ramp includes at least a first slot and a second slot;
        the cushion includes a first flexible tab and a second flexible tab;
        the first flexible tab and the second flexible tab extend through the first slot and the second slot, respectively, to thereby couple the ramp to the inflatable cushion; and
        an end of the first flexible tab and an end of the second flexible tab are configured to be connected to an interior of a vehicle body;
    wherein the first slot is oriented in a horizontal direction substantially parallel to the roof rail of the vehicle; and
    wherein the second slot is oriented in a vertical direction substantially perpendicular to the roof rail of the vehicle, and wherein the second flexible tab extends longitudinally rearward from the end of the cushion to attach to the interior of the vehicle body.

15. The inflatable curtain airbag assembly of claim 14, wherein the ramp includes a base layer of non-woven fabric.

16. The inflatable curtain airbag assembly of claim 14, wherein the ramp includes a base layer of woven fabric.

17. The inflatable curtain airbag assembly of claim 15, wherein the ramp includes a secondary layer of polyethylene.

18. The inflatable curtain airbag assembly of claim 15, wherein the ramp includes a secondary layer of polypropylene.

* * * * *